United States Patent [19]

Arrowsmith et al.

[11] 4,327,951
[45] May 4, 1982

[54] CLUTCH RELEASE BEARING ASSEMBLY
[75] Inventors: David R. Arrowsmith, Leamington Spa; David Parsons, Kenilworth, both of England
[73] Assignee: Automotive Products Limited, Leamington Spa, England
[21] Appl. No.: 156,276
[22] Filed: Jun. 4, 1980

Related U.S. Application Data
[62] Division of Ser. No. 952,779, Oct. 19, 1978, Pat. No. 4,229,058.

[30] Foreign Application Priority Data
Oct. 22, 1977 [GB] United Kingdom ............... 44027/77

[51] Int. Cl.³ ...................... F16D 13/60; F16C 19/00
[52] U.S. Cl. ................................. 308/184 A; 308/233; 192/110 B
[58] Field of Search .................. 308/26, 28, 29, 184 R, 308/184 A, 194, 233; 192/110 B

[56] References Cited
U.S. PATENT DOCUMENTS

| 2,783,100 | 2/1957 | Steeneck | 308/26 |
| 3,373,633 | 3/1968 | Desmond et al. | 308/26 |
| 3,625,327 | 12/1971 | Birdsey | 192/110 B |
| 3,882,979 | 5/1975 | Limbacher et al. | 192/110 B |
| 3,900,091 | 8/1975 | Maucher | 192/110 B |
| 3,921,775 | 11/1975 | Matyschik | 308/233 |
| 3,985,215 | 10/1976 | Ernst et al. | 192/110 B |
| 4,143,748 | 3/1979 | Maucher | 308/233 |
| 4,228,881 | 10/1980 | Nakamura | 308/233 |
| 4,229,058 | 10/1980 | Arrowsmith et al. | 308/233 |

FOREIGN PATENT DOCUMENTS
961025  1/1975  Canada ................................. 308/28

Primary Examiner—Richard R. Stearns
Attorney, Agent, or Firm—Kemon & Estabrook

[57] ABSTRACT

This invention relates to a self-aligning clutch release bearing assembly comprising a rolling element bearing having a rotary race which in use engages with a clutch member, and a non-rotary race mounted on a support for transmission of a clutch release load. The non-rotary race is relatively movable on the support transversely to the rotary axis of the bearing assembly to permit in use self-alignment of the rotary axis of the bearing with rotary axis of the clutch member. This movement is controlled by a layer of viscous material interposed between the support and the non-rotary race. The viscous material exhibits some resilience and up to a given value resistance to plastic flow so that the material locates the non-rotary race but allows it to move to achieve self-alignment on operation of the clutch in use.

2 Claims, 2 Drawing Figures

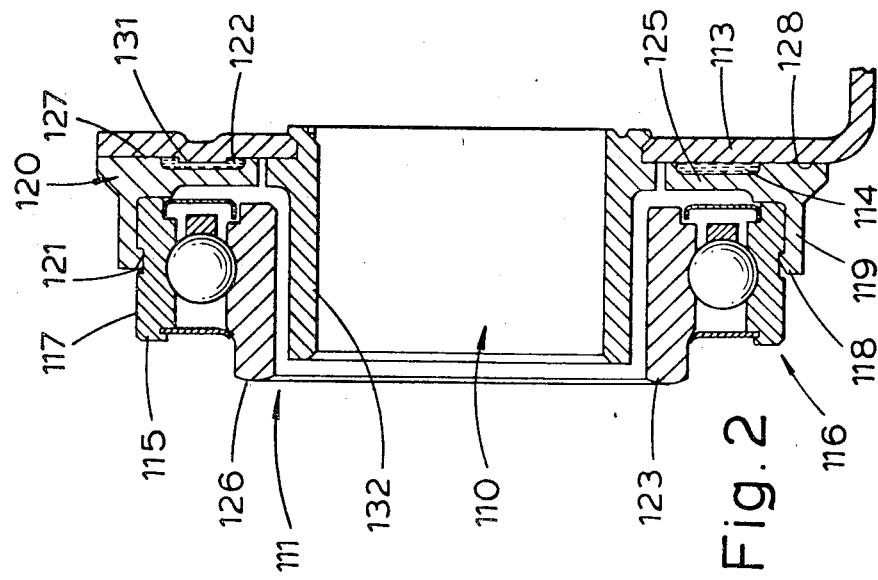
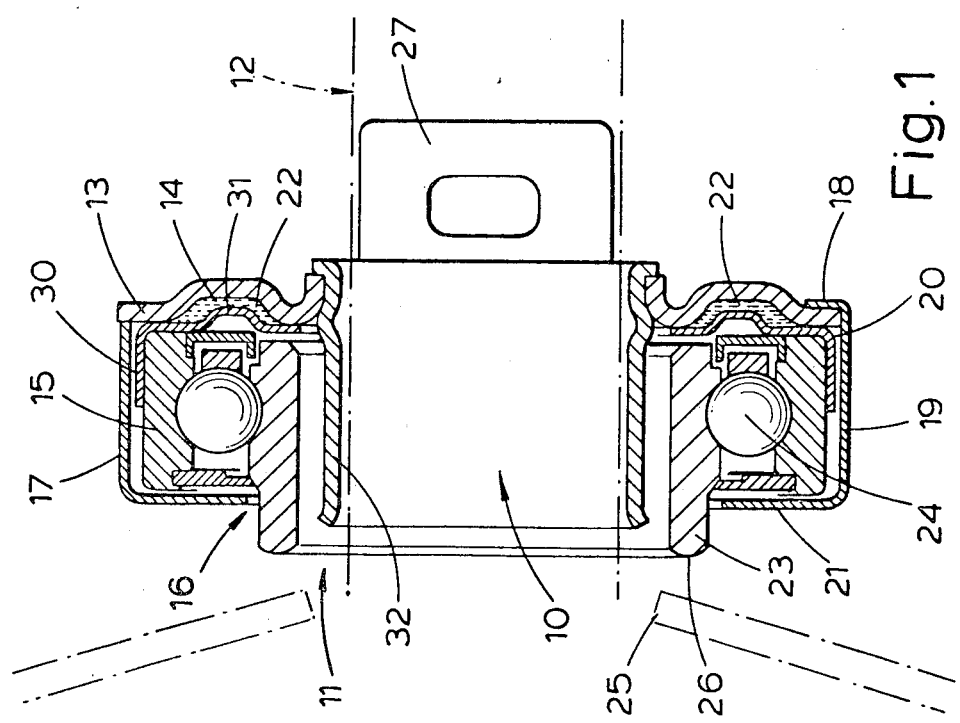

CLUTCH RELEASE BEARING ASSEMBLY

This is a division of application Ser. No. 952,779, filed 10/19/78, now U.S. Pat. No. 4,229,058.

The invention relates to clutch release bearing assemblies.

A typical clutch release bearing assembly for an automotive clutch incorporates a support which is guided for generally axial movement either on an axially extending guide member or by means of a pivotable release lever. The support normally carries a non-rotating race of a ball bearing while the other race of the bearing is rotatable and is intended for engagement with the clutch to apply an axial release load thereto. With a diaphragm spring clutch the release load is normally applied direct to the inner ends of the fingers of the diaphragm spring. In some installations the ball bearing may be replaced by a different form of rolling element bearing such as a roller bearing.

In practice it is difficult to establish accurate axial alignment between the release bearing assembly and the clutch itself. Mis-alignment can lead to a variety of problems including premature wear of diaphragm spring fingers and frictional heating leading to a short life for the ball bearing.

In order to overcome the mis-alignment problem the ball bearing can be mounted in the release member for limited transverse movement, the normal interaction between the bearing and the clutch providing a self-aligning action which then aligns the bearing with the clutch. Some control of the position of the ball bearing with respect to the release member is desirable in order to maintain alignment between the bearing and the clutch.

According to the present invention there is provided a self-aligning clutch release bearing assembly comprising a rolling element bearing having a rotary race which in use engages with and transmits an axial release load to a clutch member, and a non-rotary race mounted on a support for transmission of the axial release load from a clutch operating member, the non-rotary race being relatively movable on the support transversely to the rotary axis of the release bearing assembly to permit in use self-alignment of the rotary axis of the bearing with the rotary axis of the clutch member, characterised in that there is interposed between the non-rotary race and its support a viscous material which exhibits some resilience and also up to a given value, resistance to plastic flow under shear, the given value corresponding to the application of a given self-aligning load in intended use, so that the viscous material locates the non-rotary race but allows it to move to achieve self-alignment of the bearing on operation of the clutch in use.

The term viscous material embraces materials of a very thick treacly substance having a viscosity in excess of 500,000 centipoise and up to semi solid materials having a viscosity in the order of 10,000,000 centipoise (the latter materials can be for example polyisobutylene rubbers of a low molecular weight).

Preferably the viscous material is a constantly tacky adhesive. The adhesive properties required by the material should be an adhesive strength of at least 27,000 $N/M^2$ and preferably 60,000 $N/M^2$ (8.8 lb f/in$^2$) in shear, and at least 82,000 $N/M^2$ and preferably 185,000 $N/M^2$ in tension.

Such materials are provided by a pressure sensitive silicone adhesive, preferably Dow Corning (Reg. Trade Mark) 280A adhesive, or may alternatively be provided by uncured polyisobutylene rubbers, preferably Vistanex (Reg. Trade Mark) LMMH.

The invention will now be described by way of example and with reference to the accompanying drawing in which:

FIG. 1 is a cross-sectional view through a clutch release bearing assembly according to the invention; and FIG. 2 is a cross-section through a different release bearing in which an adhesive material retains the bearing on its support.

With reference to FIG. 1, a clutch release bearing assembly 11 is guided for axial movement on a guide 12 which does not form part of the bearing assembly and is shown in chain dotted outline. The guide 12 may for example, be a sleeve supported on a gearbox casing and may be arranged to surround the gearbox input shaft. The assembly 11 comprises a rolling element bearing 16 carried on a support 10 which comprises an axial sleeve 32 which in use surrounds the guide 12 and which has a radially outwardly projecting annular flange 13 at one end. The flange 13 has an annular forward facing groove 14 therein. The non-rotating race 15 of the bearing 16 is located against the outer peripheral portion of the flange 13. An annular pressing 17 forms a housing which as can be seen in FIG. 1 almost completely encloses the bearing 16 and which is secured to the outer periphery of the flange 13 by means of a plurality of bent over tabs 18 which extend through co-operating slots in the outer periphery of the flange. An axially extending portion 19 of the housing 17 carries an inwardly directed forward flange 21 which helps retain the bearing 16 on its support. An annular carrier plate 20 is attached to the race 15 such that it is located substantially between the non-rotating race 15 and the flange 13 and has an axially aligned peripheral portion 30 which engages the non-rotating race 15. The annular carrier plate 20 has a rearward facing annular rib 31 which co-operates loosely with the annular groove 14. There is some transverse play between the axial portion 30 of the carrier plate 20 and the flange 13 before the axial portion 30 abuts the axially extending portion 19 of the housing 17. Viscous elastic adhesive material 22 is put into the groove 14 and is in contact between the flange 13 of the release member and the carrier 20 attached to the non-rotating race 15.

The adhesive 22 is such that it holds the bearing race 5 in any pre-set position with respect to the support 10 against gravitational and vibratory forces normally encountered but that it allows relative transverse movement between race 15 and the support 10 in response to given minimum self-centring loads applied to the bearing. This given minimum load cannot be given a specific numerical value since this is determined by the intended application of the clutch. However, for a motor car clutch the adhesives Dow Corning 280A and Vistanex LMMH have the required emperical properties. Such movement being limited by abutment of the carrier 20 with the pressing 17 as previously described. The way in which these self-centring loads arise will be described subsequently.

The adhesive should be in a tacky viscous and elastic condition to enable this movement to occur and should retain its tacky condition throughout the life of the bearing, namely a period of several years. The adhesive so used is a pressure sensitive contact adhesive which required no applied pressure between the surfaces being jointed. The flange 21 on the housing whilst acting as a retainer to hold the non-rotating race 15 on the flange 13 exerts no appreciable load on the race 15 so that there is no appreciable frictional engagement between the bearing race 15 and the flange 13. An example of a material which we have found useful in this respect is Dow Corning (Reg. Trade Mark) 280A adhesive. This material is applied to the groove 14 in the flange and any solvent is flashed off and the material is cured for 5 mins. at 150° C. This results in a transformation from a relatively thin liquid material to a thick viscous elastic material, having the required preferred properties which adheres to the carrier plate 20 and flange 13. An alternative material which also exhibits the required physical characteristics is Vistanex (Reg. Trade Mark) LMMH. However, this material is suceptible to attack by mineral oils.

The bearing 16 also incorporates a rotary race 23 which moves with respect to the non-rotating race 15 on a series of balls 24. The race 23 has an annular forward extension which terminates in a curved clutch engagement surface 26 which in this example is intended to bear against the inner part of the fingers of a diaphragm spring 25.

An axially movable release fork (not shown) engages the lugs 27 on the rear face of the flange 13 and can be used to move the release bearing assembly axially on its guide sleeve 12 so that when the clutch is released the bearing assembly engages with the diaphragm spring fingers 25 and releases the clutch in a manner known per se.

If during this axial movement there is mis-alignment between the bearing 16 and the clutch, the inter-engagement of the bearing with the clutch produces a centring force which tends to move the bearing 16 into axial alignment. Centralising movement is allowed by the tacky viscous elastic adhesive 22. Once alignment has been achieved and is maintained, there will be gradual flow of the viscous elastic material so as to accomodate to the new position of the bearing. When the clutch is re-engaged the load on the release bearing 16 is removed and then the viscous adhesive 22 will hold the bearing in its centralised position, until a transverse load is applied to bearing that is sufficient to make the adhesive flow. Also the viscous elastic nature of the adhesive will help damp out the transmission of vibrations from the clutch to the release bearing member 11.

FIG. 2 shows a self-centring bearing that works in a manner very similar top that of FIG. 1 excepting that the rolling element bearing 116 is retained axially relative to the flange 113 solely by the adhesive layer 122. There is no equivalent to the pressing 17 in FIG. 1 which retains the rolling element bearing 16 and carrier 20 in position as shown in FIG. 1.

The release bearing assembly 111 comprises a rolling element bearing 116 carried on a support 110 which comprises an axial sleeve 132 which carries a radially outwardly projecting annular flange 113 at one end of the sleeve 132. The flange 113 and the sleeve 132 are moulded from glass filled nylon and are welded together or possibly moulded as a single unit. The flange 113 has a forwardly presented face 128 towards the diaphragm spring and on which are a number of spaced flat lugs 131 circumferentially distributed thereon.

The rolling element bearing 116 has a radially inner rotating race 123 and a non-rotating outer race 115. The rotating race has a curved end face 126 for contacting the diaphragm spring fingers. The radially outer surface 117 of the non-rotating race 115 has an annular groove 121 therein.

The ball bearing race 116 is held in an annular carrier plate 120, moulded in glass filled nylon 66, and comprising an inwardly projecting annular flange 125 which lies adjacent the flange 113, and an axially extending portion 119 projecting forwards towards the diaphragm spring (25 in FIG. 1) from the outer peripheral portion of the flange 125 which encompasses the outer surfaces 117 of the non-rotary race 115. The axially extending portion 119 has a detent 118 that engages with the groove 121 to hold the bearing 116 secure to the carrier plate 120.

The flange 125 has a rearwardly presented face 127 that engages the forwardly presented face on the flange 113. The rearwardly presented face 127 has an annular groove 114 therein in which the lugs 131 on the flange 113 are accomodated such that there is some free play between the lugs 131 and the walls of the groove 114 so that the carrier plate 120 can move radially with respect to the sleeve 132 and flange 113.

A layer of adhesive 122 is placed in the groove 114 and the adhesive acts between the carrier plate 120 and the flange 113 to hold the two parts together. The lugs 131 act as baffles in the groove thus providing a facility against which the damping effect of the adhesive can act. The adhesive layer 122 retains the plate 120 and flange 113 axially together solely by its adhesive effect.

Whilst it is preferable that the viscoelastic material 22 or 122 is a constantly tacky adhesive the invention also extends to a situation where a viscous elastic material, that is non-adhesive in nature, is trapped between support and the non-rotating race carrier.

We claim:

1. A self aligning clutch release bearing assembly comprising:
   a rolling element bearing having a rotary race and a non-rotary race, said non-rotary race including a part having an axially directed face;
   support means on which the bearing is mounted and which permits the non-rotary face to move transversely to the rotary axis of the release bearing assembly so that in use the bearing can align with the rotary axis of the clutch;
   an adhesive viscous material disposed in a space between the support means and said axially directed face so as to damp vibrations and permit transverse self-centering movement and being means whereby the rolling element bearing is held in axially assembly to the support means, with respective parts of the support means and the axially directed face in direct axial opposition for the transmission of clutch release load from the support means to the bearing;
   an annular retainer means acting to prevent axial separation of said axially directed face and said support means;
   one of said support means and said axially directed face has at least one baffle thereon that projects into the space filled by the adhesive to provide for enhancing the damping effect; and
   said non-rotary race held in an annular carrier plate having the axially directed face thereon, said baffle being formed as an annular rib on the carrier plate and said rib cooperates loosely with an annular groove on said support means.

2. A clutch release bearing as called in claim 1 wherein said rolling element bearing is enclosed in an annular cage secured to said support means.

* * * * *